Dec. 23, 1947.   W. W. HANSEN   2,432,990
ELECTROMAGNETIC WAVE GUIDE ANTENNA
Original Filed Nov. 26, 1940   2 Sheets-Sheet 2
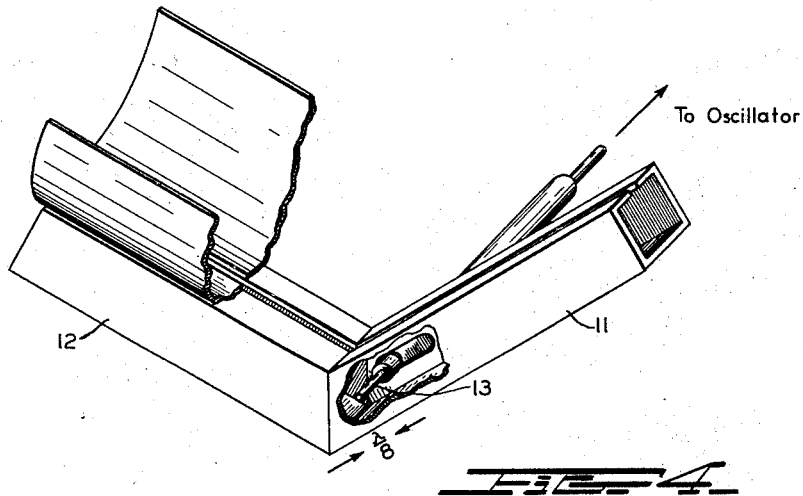
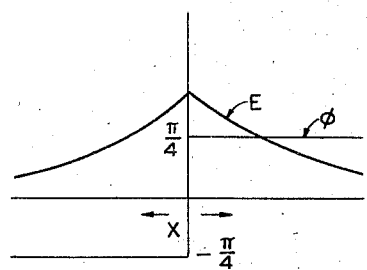
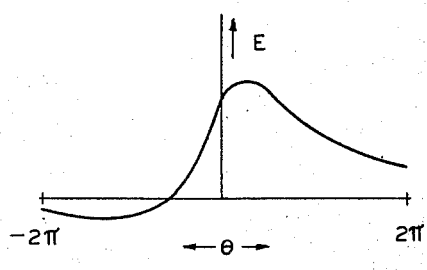
INVENTOR,
WILLIAM W. HANSEN
BY
*Paul B. Hunter.*
HIS ATTORNEY Patented Dec. 23, 1947

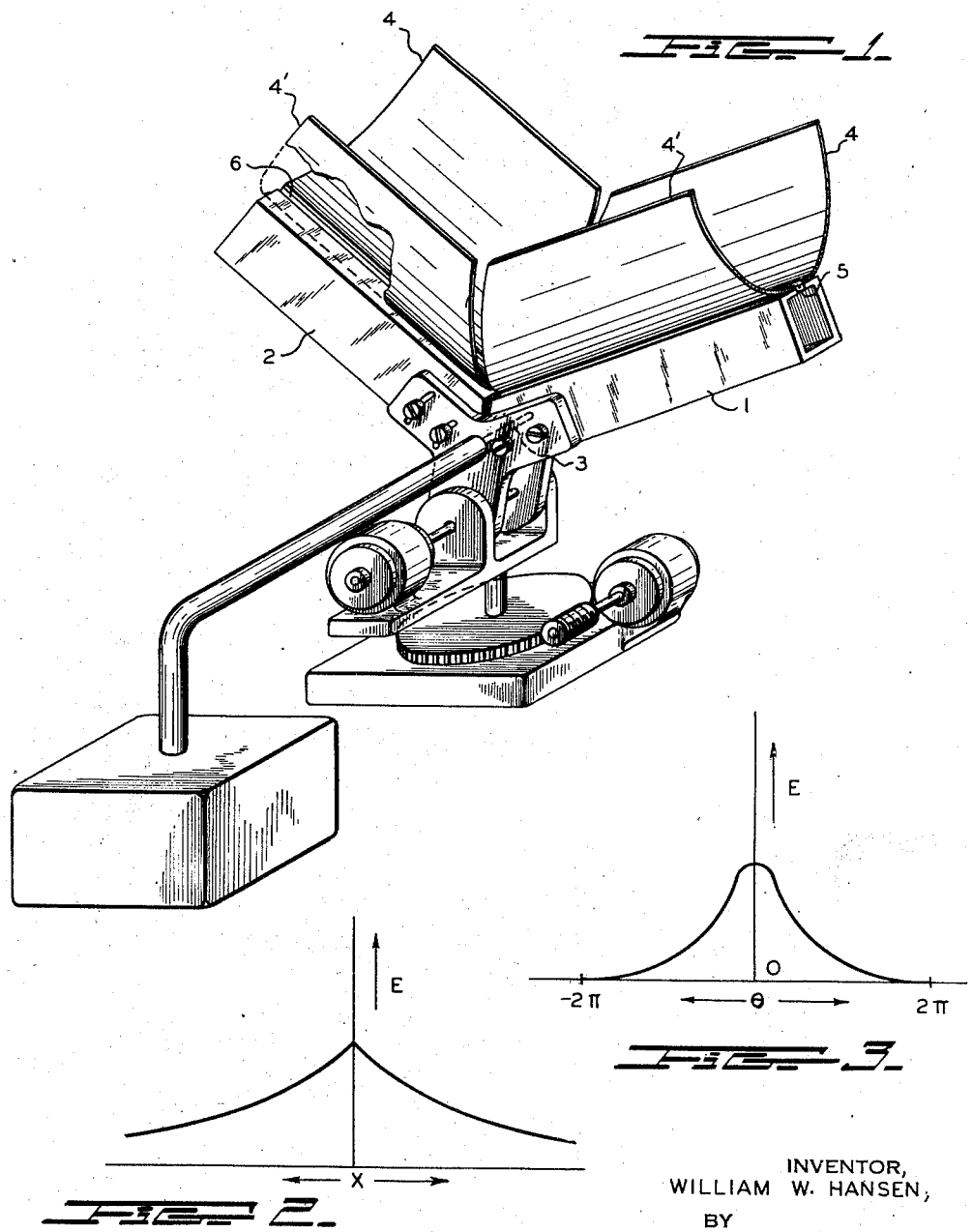

2,432,990

UNITED STATES PATENT OFFICE 2,432,990

ELECTROMAGNETIC WAVE GUIDE ANTENNA

William W. Hansen, Garden City, N. Y., assignor to The Board of Trustees of The Leland Stanford Junior University, Stanford University, Calif.

Original application November 26, 1940, Serial No. 367,196, now Patent No. 2,402,622, dated June 25, 1946. Divided and this application September 12, 1942, Serial No. 458,127

6 Claims. (Cl. 250—11)

This invention relates, generally, to the projection of radio waves in the form of a beam whose symmetry, or lack of symmetry, is controllable at will, and the invention has reference more particularly to radiating electromagnetic wave guides of the type disclosed in my copending application, Serial No. 367,196, filed November 26, 1940, now Patent No. 2,402,622 granted June 25, 1946, of which the present application is a division.

When a radiating electromagnetic wave guide is utilized to project a beam of electromagnetic radiation, to furnish, for instance, a blind landing path for airplanes, it is very important that the lower portion of such beam be well defined. To achieve such a result, and at the same time define suitable gliding angles for airplanes, requires the radiation intensity in the lower part of the beam adjacent to the ground to fall off very rapidly in the direction of increasing angles with the beam axis, in order that the amount of electromagnetic radiation striking the surface of the ground shall be very small as compared to the total energy radiated. In this manner interference patterns within the beam caused by reflection from the ground surface of electromagnetic energy reaching the ground can be minimized.

When a radio beam suitable for blind landing has been so designed that for the desirable range of gliding angles no appreciable interference is obtained due to ground reflections, then it may be found that for a beam possessing symmetry in a vertical plane, the radiation intensity for increasing angles from the axis of the beam in a skyward direction falls off too rapidly, so that airplanes may experience difficulty in locating the beam, and it will be seen that symmetrical beams are not generally satisfactory for this use. Also, it has been found that unsymmetrical beams are highly desirable for other purposes, as for certain types of directional communication, navigation, etc.

It is an object of the present invention to provide radiating electromagnetic wave guides for projecting radio beams which have an unsymmetrical radiation pattern in the plane of maximum directivity, such an unsymmetrical radiation pattern being controlled by the design of the wave guide.

Another object of the present invention is to increase the radiation intensity of an electromagnetic wave guide in a desired direction by increasing the directivity of the projected radio beam in the plane at right angles to the plane of maximum directivity, whereby the useful signal strength for a given energy supply will be increased, or the same signal strength may be obtained with less electromagnetic energy.

Still another object of the present invention is to provide radiation guides having means for launching electromagnetic energy positioned unsymmetrically therein for introducing a phase difference in the radiation from corresponding points in the guides, thereby producing a desired unsymmetrical radiation pattern.

In systems embodying the present invention, such as blind landing systems, the desired plane of maximum directivity will be vertical, and the axis of the beam will be directed to provide suitable gliding angles. In the plane of maximum directivity an unsymmetrical beam will have one direction in which the radiation intensity with increasing angles from the axis of the beam falls more rapidly than for a symmetrical beam, and for blind landing systems such a direction will be towards the ground from the axis of the beam. In the opposite direction, the radiation intensity with increasing angles from the axis of the beam will fall less rapidly than for a symmetrical beam, and in a blind landing system such a direction will be skyward from the axis of the beam, so that the beam can be readily picked up and used by an airplane. According to an important aspect of the present invention, the antenna is provided by a pair of wave guides arranged in V-fashion and apertured along their length to radiate or receive electromagnetic energy. To produce the desired asymmetrical directivity pattern, the two wave guides are so excited that points equi-distant from the guide junction are excited with respective waves of a fixed phase difference, preferably of about ninety electrical degrees. One simple method of producing such a phase difference is to have a single coupling to said wave guides, located substantially one-eighth wavelength from the guide junction.

Other objects and advantages will become apparent from the specification, taken in connection with the accompanying drawings wherein the invention is embodied in concrete form.

In the drawings,

Fig. 1 is a perspective view of a radiation guide embodying means for narrowing the radiation pattern in its wide dimensions.

Fig. 2 is a graph giving as ordinate the field excitation at the guide as a function of the distance measured along the guide for the radiation guide of Fig. 1.

Fig. 3 is a graph giving the signal strength at a distance from the radiation guide in the plane of the guide as a function of the angular deviation from the direction of maximum propagation, when the field excitation at the guide is as given in Fig. 2.

Fig. 4 represents a wave guide similar to that indicated in Fig. 1, but shown unsymmetrically excited.

Fig. 5 represents the field excitation at the guide of Fig. 4, together with the phase displacement resulting from the unsymmetrical excitation.

Fig. 6 represents the signal strength of the guide of Fig. 4 at a distance from the guide, illustrating the dissymmetry introduced in the radiation pattern.

As more fully explained in the above referred application, the general type of radiation guide of this invention is formed of a multiplicity of wave guides excited in the proper phase. Electromagnetic energy is caused to emerge from a wall of the wave guides to maintain a desired field strength excitation immediately outside the radiation guide. Due to a specific field strength excitation at the guide having a specific phase relation, a radiation pattern in space is obtained resulting from the superposition in proper phase relation of the radiation emanating from the various portions of the radiation guide.

The wavelength of an electromagnetic radiation within a guide is longer than its wavelength in free space, and depends upon the frequency of the radiation and the cross-sectional dimensions of the guide. The ratio of the wavelength of the radiation within the guide to its wavelength outside determines the angle which the direction of radiation outside the guide makes with the guide. The contribution of the various elements of a wave guide to the signal strength at a given point in space may be determined graphically by adding the vectors representing the contribution of the various elements in their proper phase relations. For certain electric field excitations at the radiation guide, the radiation pattern can be conveniently obtained by utilizing the known properties of Fourier transforms, as more fully explained in the above-referred-to parent application Serial No. 367,196.

In Fig. 1, the radiation guide illustrated is formed of two straight wave guide portions, 1 and 2, of equal cross-section, excited in the same phase and at the same intensity by antenna 3 symmetrically located with respect to the wave guides 1 and 2. Wave guides 1 and 2 form an angle having a bisectrix corresponding to the direction of maximum radiation of the radiation guide. Guides 1 and 2 are provided with slots 5 and 6 of uniform width in corresponding walls thereof so that a constant proportion of the electromagnetic energy within the guides is radiated into space for each element of length. By taking the antenna location in Fig. 1 as origin of abscissae, then the electric field immediately outside the guide is as indicated in Fig. 2, decreasing exponentially with increasing distance from the origin, where the electric field is plotted as ordinate E, against distances, X, along the guides, as abscissae. Such a field excitation at the guide will give a field distribution in the plane of the guide at a distant point as shown in Fig. 3, where the abscissae are proportional to the angular deviation from the direction of maximum radiation, that is, the bisectrix of the angle between wave guides 1 and 2 in Fig. 1. The proportionality factor relating actual angles to the abscissae plotted in Fig. 3 can be determined from the physical constants involved, or may readily be determined for an actual radiation guide by a field test to determine, for instance, the angular deviation causing a fifty per cent decrease in field strength from its maximum value.

In Fig. 1, the ground plates 4, 4' which serve to launch into space the electromagnetic energy leaving the guides through the slots 5 and 6 are curved concavely facing each other in order to increase the directivity of the radiation in a plane at right angles to the plane of the radiation guide. According to theory, the lines representing the electric vector of the radiation passing through the slot should meet the surface of ground plates 4 and 4' at right angles. The directivity of the radiation in the plane at right angles to the radiation guide is increased by causing the lines representing the electric vector to be only slightly curved where they leave the ground plates to be launched into space, and by making the distance between the outer free edges of the ground plates 4, 4' equal to a number of wavelengths of the energy radiated. The efficiency of the wave guide for obtaining greater directivity is thereby increased. It is to be understood that the ground plates 4, 4' may be employed, if desired, in conjunction with any radiating wave guide of the present invention to obtain increased directivity of the radiation in the plane at right angles to the guide.

In Fig. 1 the excitation of the radiation guide by antenna 3 is such that corresponding points of guides 1 and 2, i. e., located at equal distances from the origin or apex of the guide, are excited in the same phase, resulting in a symmetrical radiation pattern.

In Fig. 4, antenna 13 is not symmetrically located with respect to wave guides 11 and 12, but is shown located in guide 11 at a distance from the origin or apex of the guide equal to one-eighth of a wavelength of the electromagnetic energy. Hence, the electromagnetic energy will reach the point in guide 12 corresponding to the antenna location in guide 11 after traveling a distance of one-quarter-wavelength, resulting in a phase delay of $\pi/2$. Except for the small distance of a quarter-wavelength at the origin, all points in wave guide 12 will experience a phase delay of $\pi/2$ relative to the corresponding points in wave guide 11.

The electric field excitation at the guide of Fig. 4 is shown in Fig. 5, where the electric field, E is plotted as ordinates against distances, X, along the guides as abscissae. A second plot indicates the phase angle difference between corresponding points, the phase angle being plotted as ordinate against distances, X, as abscissa. The phase angle between corresponding points is obtained by adding the ordinates of the points algebraically. In Fig. 5, the phase angle between corresponding points is shown to be constant, and equal to $\pi/2$.

Fig. 6 is a graph similar to Fig. 3, illustrating the radiation pattern obtained at a distance point in the plane of the radiation guide of Fig. 4, when the field excitation at the guide is that shown in Fig. 5. It will be noted that the resulting radiation pattern is unsymmetrical, the field intensity for a given angular deviation decreasing much more rapidly for a deviation to the left than for an equal deviation to the right. It is to be understood that the antenna 13 shown in Fig. 4 need not be positioned at an exact one-eighth of a wavelength from the origin or apex of the guides 11 and 12 but may be displaced empirically to obtain the desired unsymmetrical radiation pattern.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. High frequency radiating apparatus comprising a pair of rectangular hollow wave guides disposed at an acute angle with respect to one another and having a common vertex, said wave guides having slots in the faces opposing one another for permitting radiation of high frequency waves from within said wave guides, and means for exciting said wave guides, comprising coupling means located within one of said wave guides at a distance from said vertex of substantially one-eighth wavelength of the operating frequency, whereby an unsymmetrical radiation pattern is produced.

2. High frequency radiant energy antenna apparatus comprising a pair of hollow wave guides disposed at an angle with respect to one another to form a V, each of said wave guides having a slot in the wall thereof facing the other of said wave guides, and coupling means located within one of said wave guides and displaced from the vertex of said V, whereby an unsymmetrical directivity pattern is produced.

3. High frequency antenna apparatus comprising a pair of hollow wave guides disposed at an angle to one another to form a V, each of said wave guides being apertured along the length thereof on the side facing the bisectrix of said V, and means for exciting said wave guides with respective high frequency waves having a relative phase difference of substantially 90 degrees, whereby an unsymmetrical directivity pattern is produced.

4. High frequency antenna apparatus comprising a pair of wave guide antennae angularly disposed with respect to one another in the form of a V, and means for exciting said antennae to produce an unsymmetrical radiation pattern, said last-named means comprising a coupling disposed within one of said antennae and displaced from the vertex of said V.

5. High frequency antenna apparatus comprising a pair of communicating wave guides angularly disposed with respect to one another in the form of a V having said guides as the respective arms thereof, and coupling means disposed within one of said arms whereby an unsymmetrical directivity pattern is produced.

6. High frequency antenna apparatus comprising a pair of hollow conducting apertured tubes disposed at an angle with respect to one another and forming a V, and means for producing an unsymmetrical directivity pattern for said antenna apparatus comprising means for coupling high frequency energy to a point within one of said tubes.

WILLIAM W. HANSEN.

REFERENCES CITED

The following references are of record in the file of this patent:

UNITED STATES PATENTS

| Number | Name | Date |
| --- | --- | --- |
| 2,206,923 | Southworth | July 9, 1940 |
| 2,402,622 | Hansen | June 25, 1946 |

FOREIGN PATENTS

| Number | Country | Date |
| --- | --- | --- |
| 507,473 | Great Britain | June 14, 1939 |
| 839,117 | France | Dec. 26, 1938 |